US012717114B2

(12) United States Patent
Takimoto et al.

(10) Patent No.: US 12,717,114 B2
(45) Date of Patent: Aug. 25, 2026

(54) OPTICAL-ELEMENT DRIVING DEVICE, CAMERA MODULE, AND CAMERA-MOUNTED DEVICE

(71) Applicants: Yukihiro Takimoto, Tokyo (JP); Masahiko Aranai, Tokyo (JP)

(72) Inventors: Yukihiro Takimoto, Tokyo (JP); Masahiko Aranai, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 304 days.

(21) Appl. No.: 18/408,660

(22) Filed: Jan. 10, 2024

(65) Prior Publication Data

US 2024/0241342 A1 Jul. 18, 2024

(30) Foreign Application Priority Data

Jan. 12, 2023 (JP) ................................ 2023-003201

(51) Int. Cl.

| | |
|---|---|
| ***G02B 7/08*** | (2021.01) |
| ***G02B 27/64*** | (2006.01) |
| ***G03B 5/00*** | (2021.01) |
| ***H04N 23/55*** | (2023.01) |
| ***H04N 23/57*** | (2023.01) |
| ***H04N 23/68*** | (2023.01) |

(52) U.S. Cl.

CPC ............ *G02B 7/08* (2013.01); *G02B 27/646* (2013.01); *G03B 5/00* (2013.01); *H04N 23/55* (2023.01); *H04N 23/57* (2023.01); *H04N 23/687* (2023.01)

(58) Field of Classification Search

CPC .......... G02B 7/08; G02B 27/646; G03B 5/00; G03B 7/04; H04N 23/57; H04N 23/687

See application file for complete search history.

(56) References Cited

U.S. PATENT DOCUMENTS

2018/0239217 A1* 8/2018 Konuma .................. G02B 7/04

FOREIGN PATENT DOCUMENTS

JP 2016-180836 A 10/2016

* cited by examiner

*Primary Examiner* — Nathanael R Briggs

(74) *Attorney, Agent, or Firm* — Shih IP Law Group, PLLC.

(57) ABSTRACT

An optical-element driving device includes at least one set of wire members aligned with each other, configured to couple the fixing part to the housing, and connected to an electrical component of the fixing part. The fixing part includes a recessed portion that is recessed in an upper-lower direction, and a sidewall of the recessed portion includes a first portion and a second portion in a direction in which the wire members are aligned with each other, the first portion located at a position corresponding to each wire member, the second portion located between adjacent ones of the first portions, and the sidewall is shaped to be indented at the first portions to bypass corresponding wire members, and to protrude at the second portion toward a gap between the adjacent wire members.

4 Claims, 10 Drawing Sheets

OPTICAL-ELEMENT DRIVING DEVICE, CAMERA MODULE, AND CAMERA-MOUNTED DEVICE

CROSS REFERENCE TO RELATED APPLICATIONS

This application is entitled to or claims the benefit of Japanese Patent Application No. 2023-003201, filed on Jan. 12, 2023, the disclosure of which including the specification, drawings and abstract is incorporated herein by reference in its entirety.

TECHNICAL FIELD

The present invention relates to an optical-element driving device, a camera module, and a camera-mounted device.

BACKGROUND ART

In general, a small-sized camera module is mounted in mobile terminals, such as smartphones. In such a camera module, an optical-element driving device that drives an optical element is used.

The optical-element driving device includes an autofocus function (hereinafter referred to as "Auto Focus (AF) function") and a shake-correcting function (hereinafter referred to as "Optical Image Stabilization (OIS) function"). The optical-element driving device automatically performs focusing by the AF function during capturing an image of a subject, and reduces irregularities of an image by the OIS function by correcting shake (vibration) caused during capturing of the image.

For example, Patent Literature (hereinafter, referred to as "PTL") 1 describes an optical-element driving device having an AF function and an OIS function. The optical-element driving device described in PTL 1 includes: a movable part capable of holding an optical element and including a coil; a rectangular cylindrical housing including a magnet and configured to house the movable part such that the movable part is movable in a direction of an optical axis (optical-axis direction); and a fixing part supporting the movable part and the housing such that the movable part and the housing are movable in a direction intersecting the optical axis (optical-axis-orthogonal direction).

Further, for example, the optical-element driving device described in PTL 1 includes a leaf spring member mounted in the housing and supporting the movable part from an upper opening side of the movable part, and two wire members extending between the fixing part and the leaf spring member so as to correspond to each of the four corner portions of the housing and configured to support the housing. The two wire members at each of the four corner portions of the housing are connected respectively to different leaf spring members. Each wire member is electrically connected to an electrical component disposed on the fixing part, and is used for power supply or signal transmission.

CITATION LIST

Patent Literature

PTL 1

Japanese Patent Application Laid-Open No. 2016-180836

SUMMARY OF INVENTION

Technical Problem

Meanwhile, some conventional optical-element driving devices achieve miniaturization of the device by a configuration in which an electrical component is embedded in a fixing part such that a connecting part between a wire member and an electrical component is exposed. In such a case, depending on the structure of the fixing part, the fixing part may be affected and deformed in an undesired way by heat applied to the connecting part during a connecting operation between a wire component and the electrical component. That is, a problem may arise in terms of mass productivity of the device.

An object of the present invention is to provide an optical-element driving device, a camera module, and a camera-mounted device capable of achieving both miniaturization and mass productivity.

Solution to Problem

One aspect of an optical-element driving device according to the present invention is an optical-element driving device that supports a movable part and a housing above a fixing part by a supporting part, the movable part being capable of holding an optical element, the housing being configured to house the movable part, the optical-element driving device being configured to move the movable part and the housing by driving a driving part, in which

- the supporting part includes at least one set of a plurality of wire members aligned with each other, configured to couple the fixing part to the housing, and connected to an electrical component of the fixing part,
- the fixing part includes a recessed portion that is recessed in an upper-lower direction and exposes, on a bottom portion of the recessed portion, a connecting part for connection between the electrical component and each of the plurality of wire members, the recessed portion including a sidewall that includes a first portion and a second portion in a direction in which the plurality of wire members are aligned with each other, the first portion being located at a position corresponding to each of the plurality of wire members, the second portion being located between adjacent ones of a plurality of the first portions, the sidewall being shaped to be indented at the first portion so as to bypass a corresponding wire member, and to protrude at the second portion toward a gap between the adjacent wire members.

One aspect of a camera module according to the present invention includes:

- the above-described optical-element driving device;
- the optical element; and
- an image capturing part configured to capture a subject image imaged by the optical element.

One aspect of a camera-mounted device according to the present invention is a camera-mounted device that is an information apparatus or a transporting apparatus, the camera-mounted device including:

- the above-described camera module; and
- an image processing part configured to process image information obtained by the camera module.

Advantageous Effects of Invention

According to the present invention, it is possible to achieve both miniaturization and mass productivity of an optical-element driving device, a camera module, and a camera-mounted device.

DESCRIPTION OF EMBODIMENTS

Hereinafter, embodiments of the present invention will be described in detail with reference to the drawings.

Regarding Configuration of Camera-Mounted Device

To begin with, a camera-mounted device to which a camera module according to an embodiment of the present invention is applied will be described.

Figure 1A:
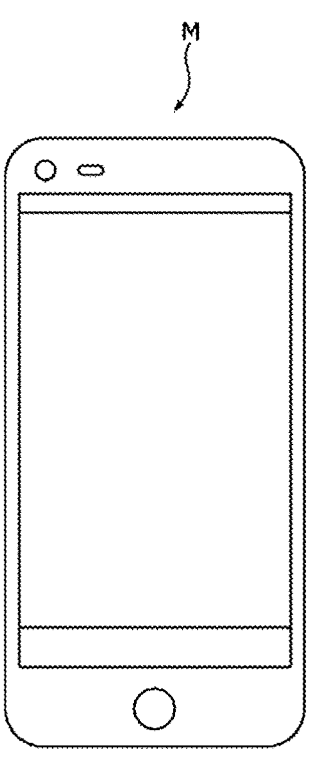
FIG. 1A is a front view of an example of a camera-mounted device on which a camera module according to an embodiment of the present invention is mounted.
Figure 1B:
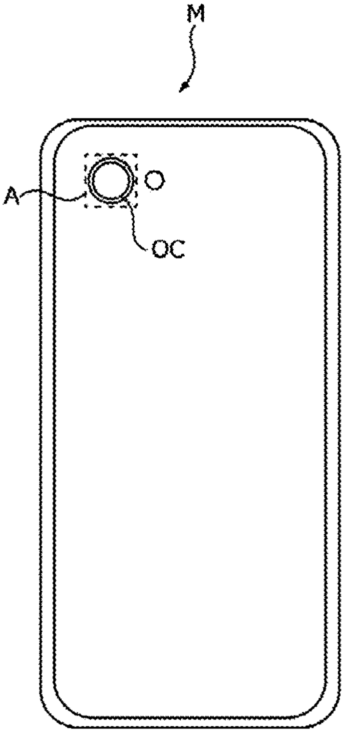
FIG. 1B is a rear view of an example of the camera-mounted device according to the embodiment of the present invention.

FIGS. 1A and 1B are diagrams illustrating smartphone M (an example of the camera-mounted device) equipped with camera module A. FIG. 1A is a front view of smartphone M and FIG. 1B is a rear view of smartphone M. Smartphone M includes one or more rear cameras OC. Camera module A is applied to rear cameras OC.

Smartphone M is a camera-mounted device that is an information apparatus. Smartphone M includes camera module A and an image processing part that processes image information obtained by camera module A. Camera module A has an AF function and an OIS function, and can capture an image without image blurring by automatically performing focusing at the time of capturing a subject and by optically correcting shake (vibration) caused at the time of capturing the image.

Figure 2A:
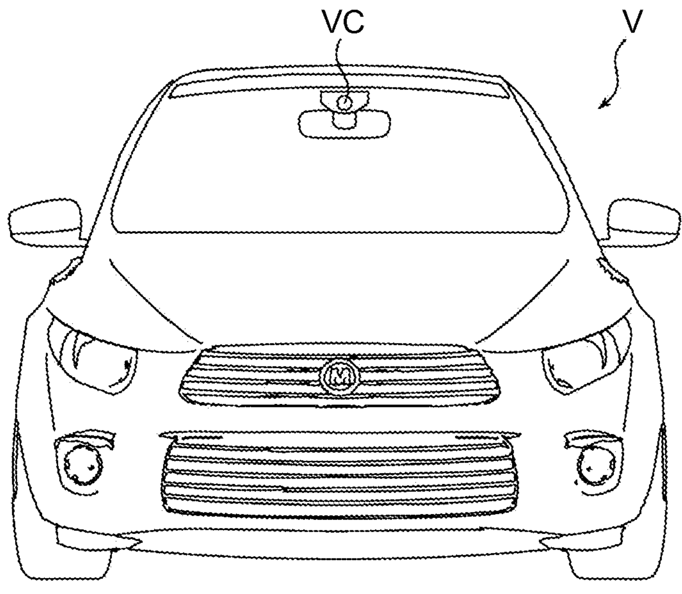
FIG. 2A is a front view of another example of the camera-mounted device on which the camera module according to the embodiment of the present invention is mounted.
Figure 2B:
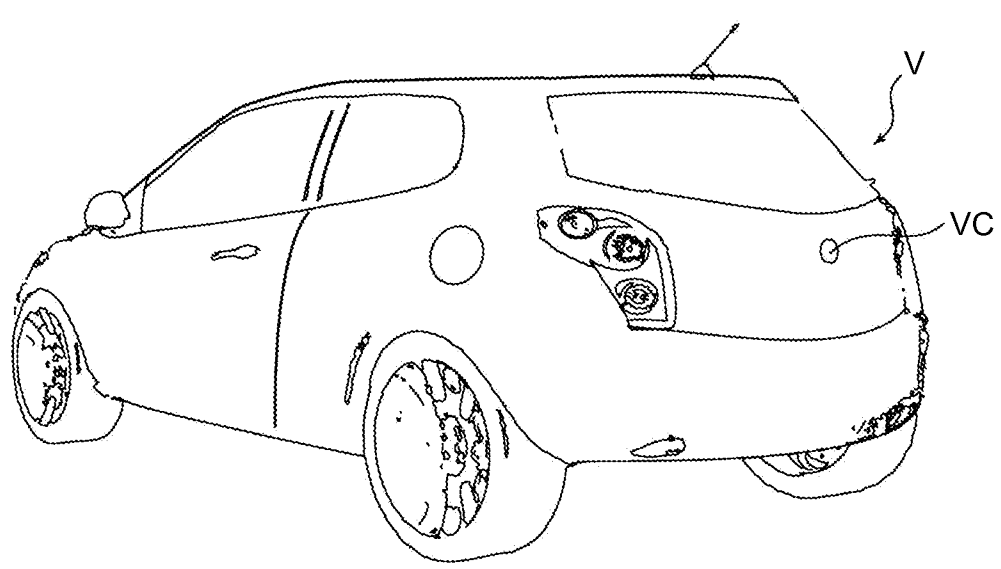
FIG. 2B is a perspective view of another example of the camera-mounted device according to an embodiment of the present invention.

FIGS. 2A and 2B are diagrams illustrating automobile V (another example of the camera-mounted device) in which in-vehicle camera module VC (Vehicle Camera) is mounted. FIG. 2A is a front view of automobile V and FIG. 2B is a rear perspective view of automobile V. As illustrated in FIGS. 2A and 2B, in-vehicle camera module VC may for example, be attached to the windshield so as to face forward, or to the rear gate so as to face backward. In-vehicle camera module VC is used for rear-view monitoring, drive recording, collision avoidance control, automatic drive control, and the like. Camera module A is applied as in-vehicle camera module VC of automobile V.

In-vehicle camera module VC is a camera-mounted device that is a transportation apparatus. In-vehicle camera module VC includes camera module A and an image processing part that processes image information obtained by camera module A. In-vehicle camera module VC has the AF function and the OIS function, and can automatically perform focusing when a subject is captured, and can capture images without image blur by optically correcting shake (vibration) generated during imaging.

Note that an optical-element driving device is applicable to various camera-mounted devices. For example, the camera-mounted device includes various information apparatuses and transportation apparatuses. Examples of the information apparatuses include a camera-mounted mobile phone, a note-type personal computer, a tablet terminal, a mobile game machine, and a web camera. Further, examples of the transportation apparatuses include camera-mounted in-vehicle devices (for example, a rear-view monitor device, a drive recorder device), and an unmanned aerial vehicle such as a drone. Note that, the unmanned aerial vehicle such as the drone is also an example of the information apparatus.

Regarding Configuration of Camera Module A

Next, a schematic configuration of camera module A will be described. The orthogonal coordinate system (X,Y,Z) is used. It is needless to say that expressions relating to shapes are convenient expressions for the sake of a simple general description, and the definitions of geometrically accurate figures do not necessarily apply.

Figure 3:
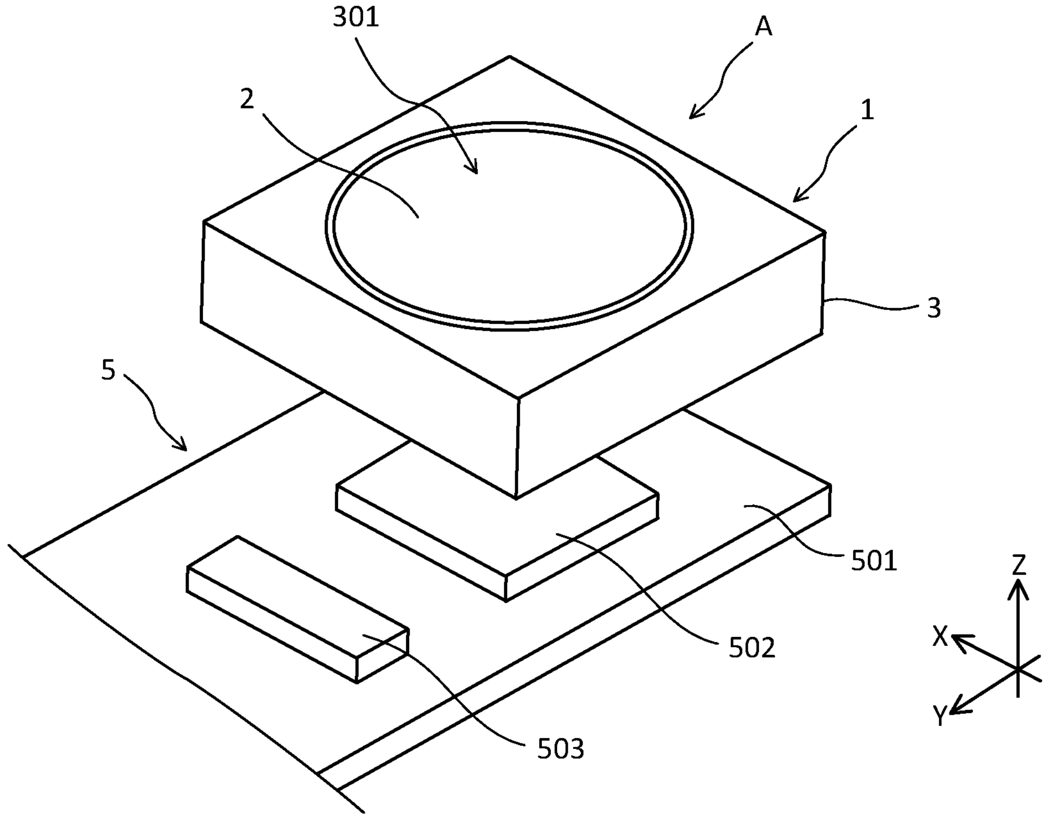
FIG. 3 is a perspective view schematically illustrating a configuration of the camera module according to the embodiment of the present invention.

FIG. 3 is a perspective view schematically illustrating a configuration of camera module A. Camera module A is mounted such that the vertical direction (or horizontal direction) is the X-direction, the horizontal direction (or vertical direction) is the Y-direction, and the front-rear direction is the Z-direction, for example, during capturing an image with smartphone M. That is, the Z-direction is an optical-path direction, and the upper side (+Z side) in FIG. 3 is a light reception side (also referred to as "macro position side") in the optical-path direction and the lower side (−Z side) is an image formation side (also referred to as "infinity position side") in the optical-path direction. Directions orthogonal to the Z-direction are optical-path-orthogonal directions. The X-direction and the Y-direction are examples of the optical-path-orthogonal directions.

Figure 4:
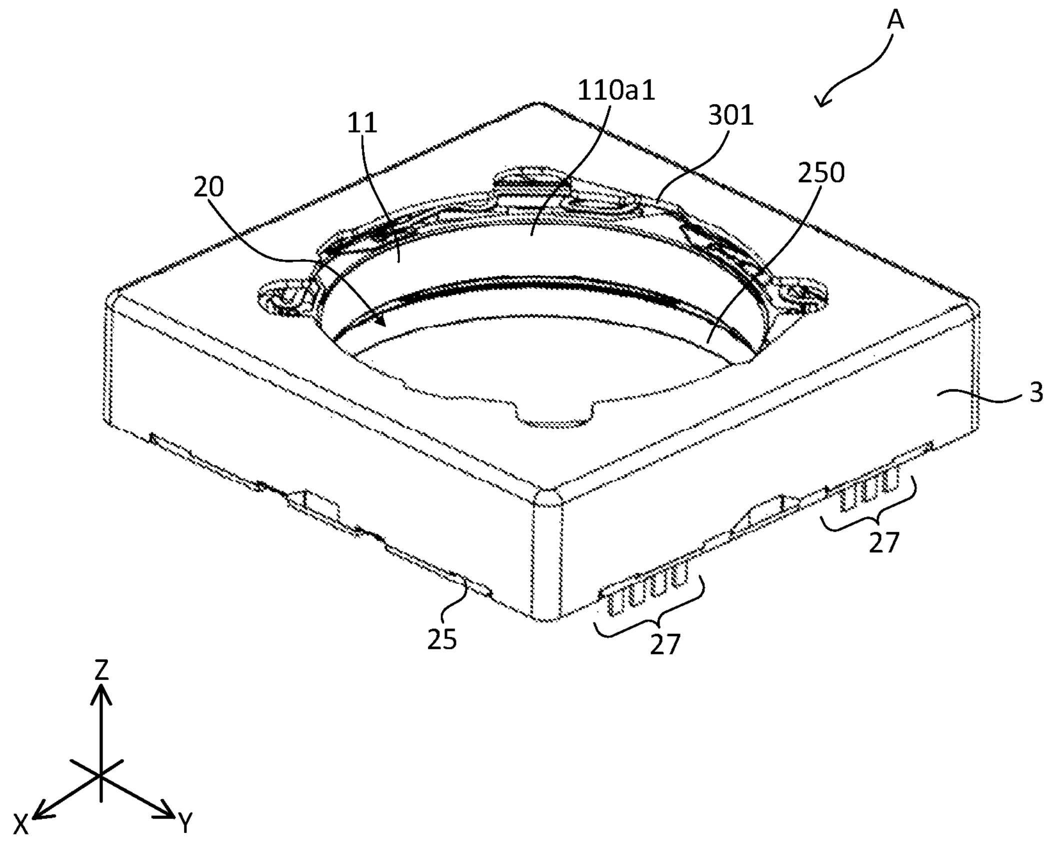
FIG. 4 is an external perspective view of the optical-element driving device of the camera module according to the embodiment of the present invention.

FIG. 4 is an external perspective view of optical-element driving device 1 of camera module A. As illustrated in FIG. 4, the optical path through which light passes is formed by opening portion 301 of cover 3, lens housing opening portion **110*a*1 in AF focusing part 11 for housing lens part 2, and central opening portion 250 in OIS base part 20 for image capturing element 502**. The direction in which the optical path extends (the penetration direction of each opening portion) is the optical-path direction. The optical-path direction may also be referred to by another designation such as an optical-axis direction and a focus direction (a direction in which the focus is adjusted) depending on the type or the like of the optical element. The optical-path-orthogonal direction may be referred to as an optical-axis-orthogonal direction, a shake correction direction, or the like, and the XY plane may be referred to as an optical-axis-orthogonal plane, a shake correction plane, or the like.

In the following description, unless otherwise specified, "radial direction" means a direction extending radially or centrifugally from the optical path or the optical axis as a center, and "circumferential direction" means a direction extending around the optical path or the optical axis. Unless otherwise specified, "outer/outside" means an outer side in the radial direction away from the optical path or the optical axis as the center, and "inner/inside/" means an inner side in the radial direction toward the optical path or the optical axis as the center.

Further, in the following description, four corners of the shape (here, a square) of camera module A as seen in plan view may be distinguished from each other and specified. In this case, for convenience, a corner portion on the + side in the X-direction and the + side in the Y-direction is referred to as a first corner portion, a corner portion on the − side in the X-direction and the + side in the Y-direction is referred to as a second corner portion, a corner portion on the − side in the X-direction and the − side in the Y-direction is referred to as a third corner portion, and a corner portion on the + side in the X-direction and the − side in the Y-direction is referred to as a fourth corner portion.

As illustrated in FIG. 3, camera module A includes:

optical-element driving device 1 that implements the AF function and the OIS function; lens part 2 (one example of the optical element) composed of a cylindrical lens barrel and a lens housed therein; and image capturing part 5 configured to capture a subject image imaged by lens part 2.

Optical-element driving device 1 is externally covered by cover 3. Cover 3 is a capped quadrangular tube having a substantially rectangular shape in plan view seen from above in the Z-direction. Here, cover 3 has a square shape in plan view. Cover 3 includes substantially circular opening portion 301 in an upper surface (a surface on the + side in the Z-direction). Lens part 2 faces the outside from opening portion 301 of cover 3. Cover 3 is fixed to base member 25 of OIS base part 20 of optical-element driving device 1, for example, adhesively (see FIG. 4). Cover 3 is made of, for example, a magnetic material, and functions as a shielding member that blocks electromagnetic waves from the outside of optical-element driving device 1 and prevents magnetic interaction between the inside and the outside of optical-element driving device 1.

Image capturing part 5 is disposed on the image formation side (the − side in the Z-direction) of optical-element driving device 1. Image capturing part 5 includes, for example, image sensor board 501, image capturing element 502, and control part 503 mounted on image sensor board 501. Image capturing element 502 is composed of, for example, a Charge-Coupled Device (CCD) image sensor, a Complementary Metal Oxide Semiconductor (CMOS) image sensor, or the like, and captures a subject image imaged by lens part 2. Optical-element driving device 1 is mounted on image sensor board 501 and is electrically connected to image sensor board 501.

Control part 503 is composed, for example, of a control Integrated Circuit (IC), and performs a drive control of optical-element driving device 1. Control part 503 may be disposed on image sensor board 501, or may be disposed on a camera-mounted apparatus on which camera module A is mounted (smartphone M in the case).

Here, a configuration is employed in which lens part 2 of OIS correcting part 10 is movable in the optical-axis direction and the optical-axis-orthogonal direction in optical-element driving device 1 with respect to image sensor board 501 whose position is fixed. However, for the purpose of focusing or shake correction, lens part 2 may be fixed (immovable) in at least one of the optical-axis direction and the optical-axis-orthogonal direction, and image capturing element 502 may be movable. In this case, image capturing element 502 is an exemplary optical element held by AF focusing part 11 or OIS correcting part 10.

Regarding Configuration of Optical-Element Driving Device 1

Next, the configuration of optical-element driving device 1 will be described with reference to FIGS. 5 to 10. In the description of the configuration of optical-element driving device 1, for the sake of convenience, the + side in the Z-direction is referred to by "upper" and the − side in the Z-direction is referred to by "lower."

Figure 5:
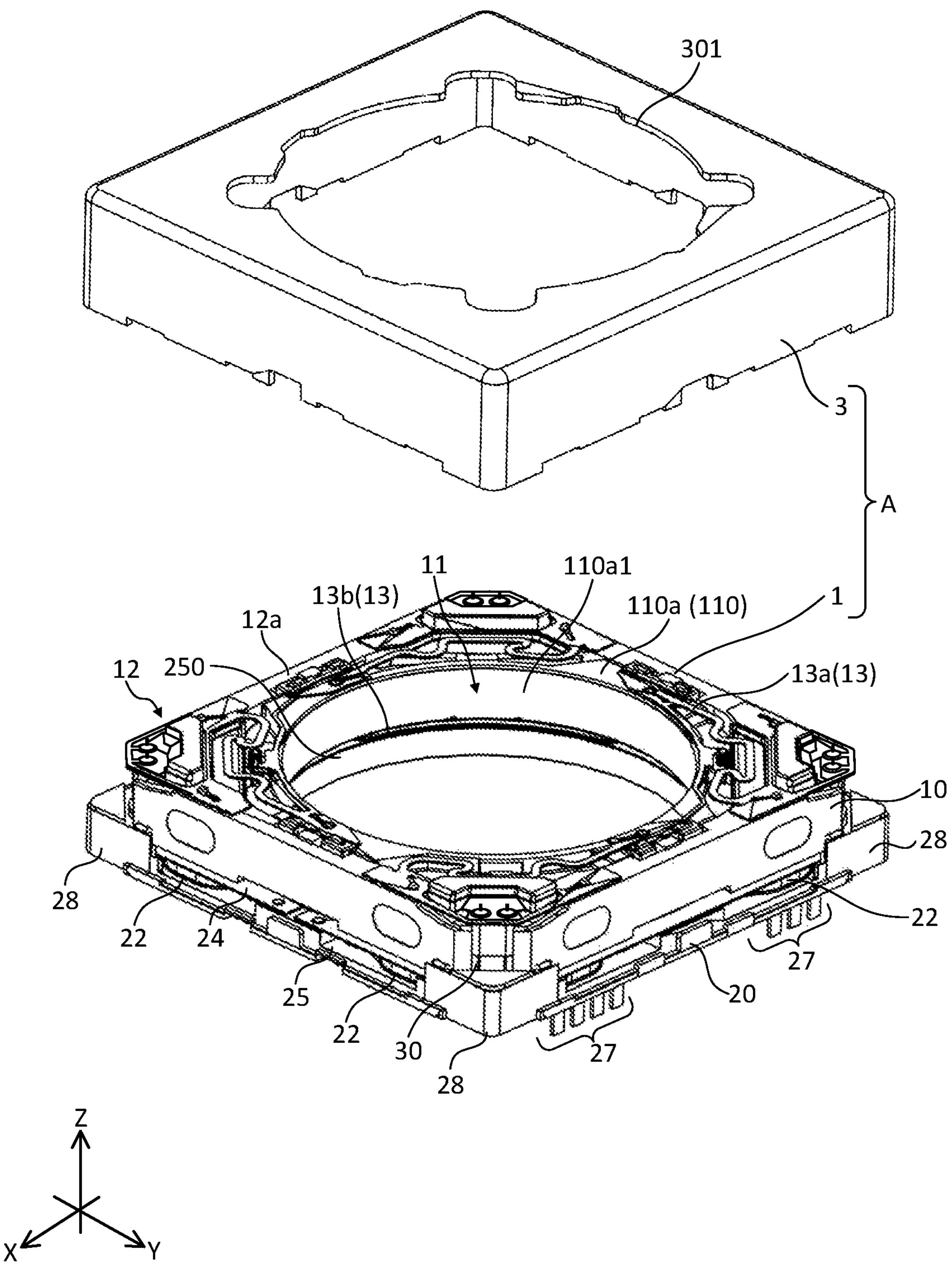
FIG. 5 is an upper exploded perspective view of the camera module according to the embodiment of the present invention in a state in which a cover is removed from the optical-element driving device.
Figure 6:
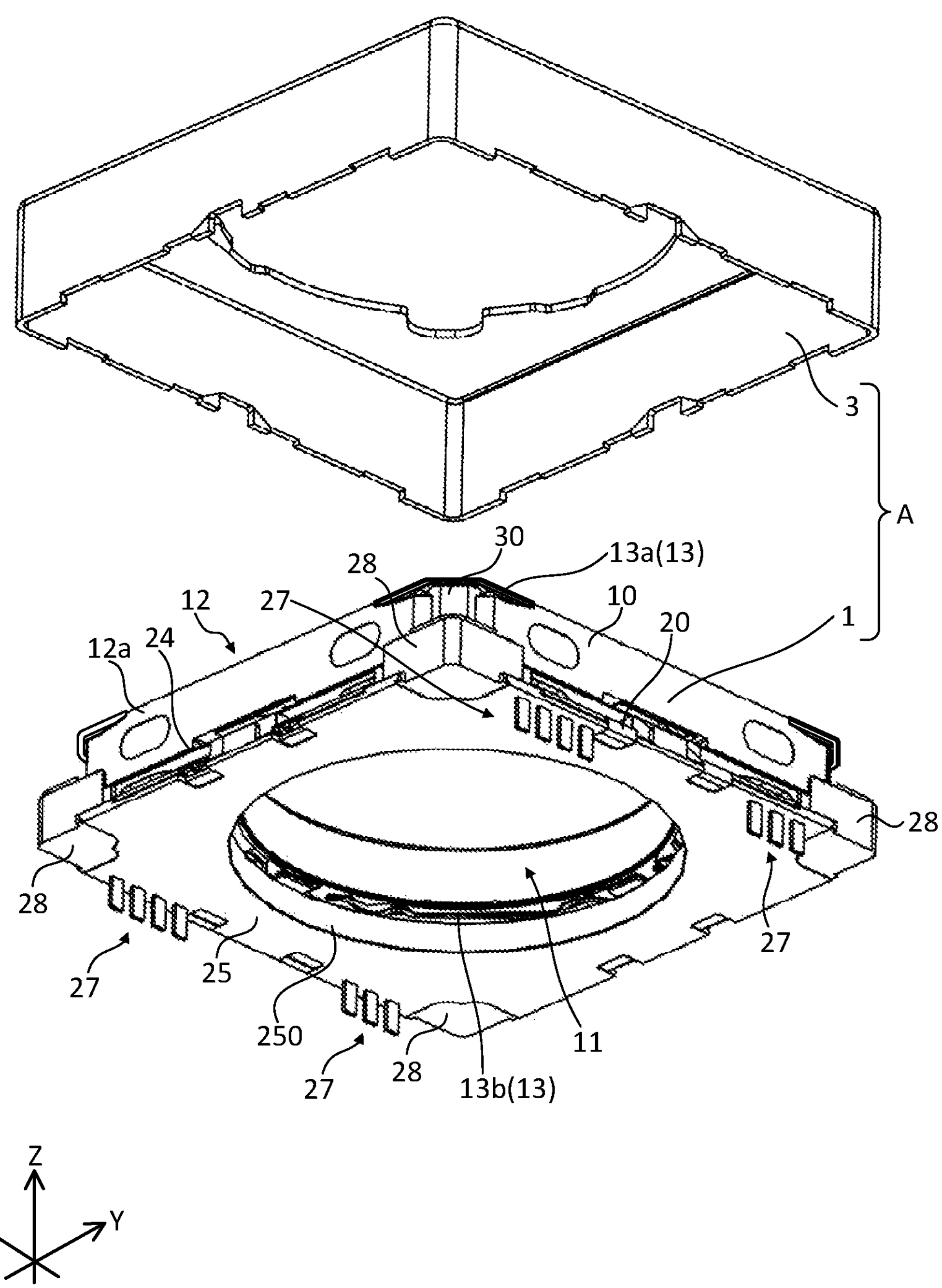
FIG. 6 is a lower exploded perspective view of the state illustrated in FIG. 5 according to the embodiment of the present invention.
Figure 7:
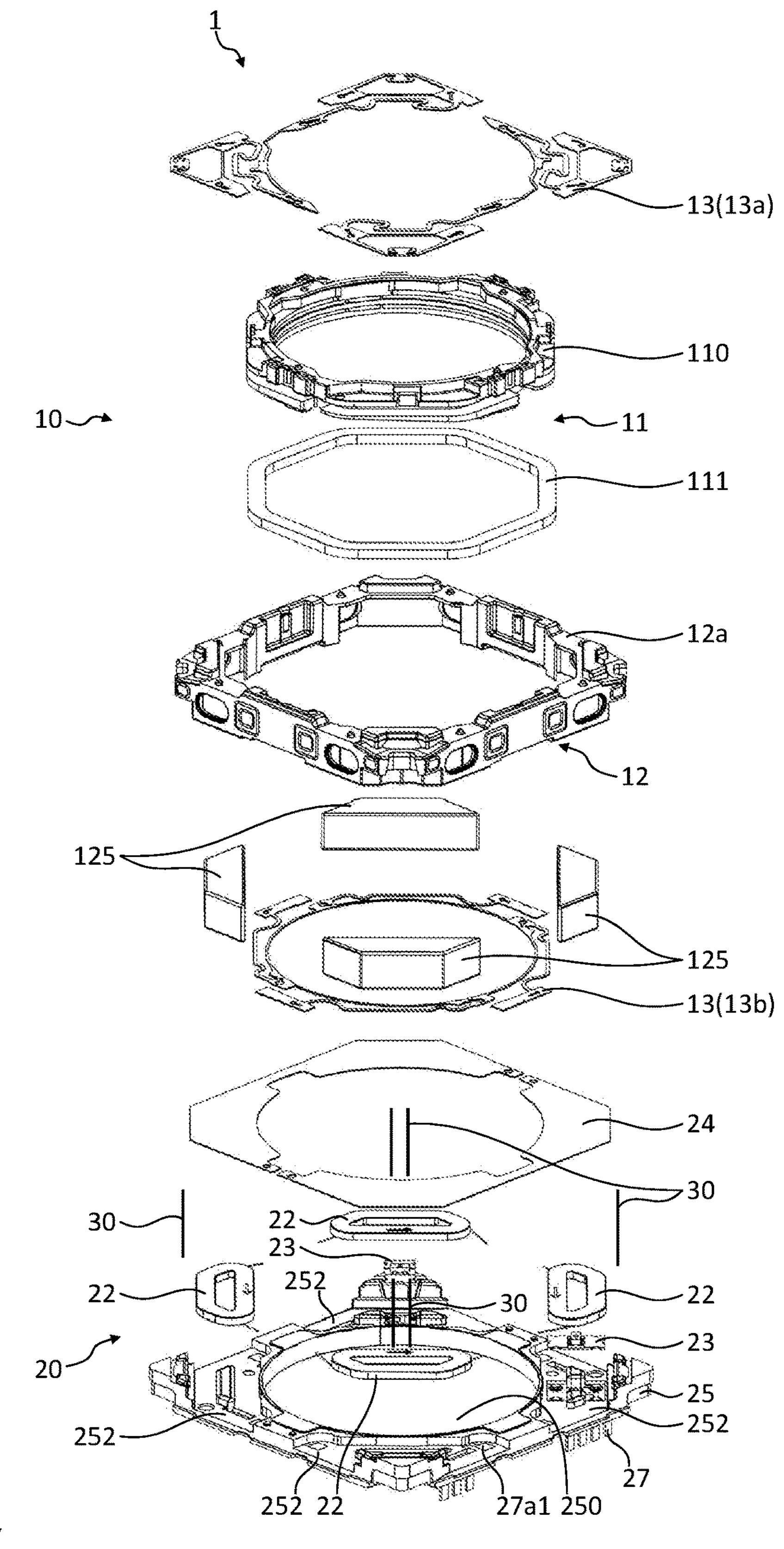
FIG. 7 is an exploded perspective view illustrating an internal configuration of the optical-element driving device illustrated in FIG. 5 according to an embodiment of the present invention from which the cover is removed.
Figure 8:
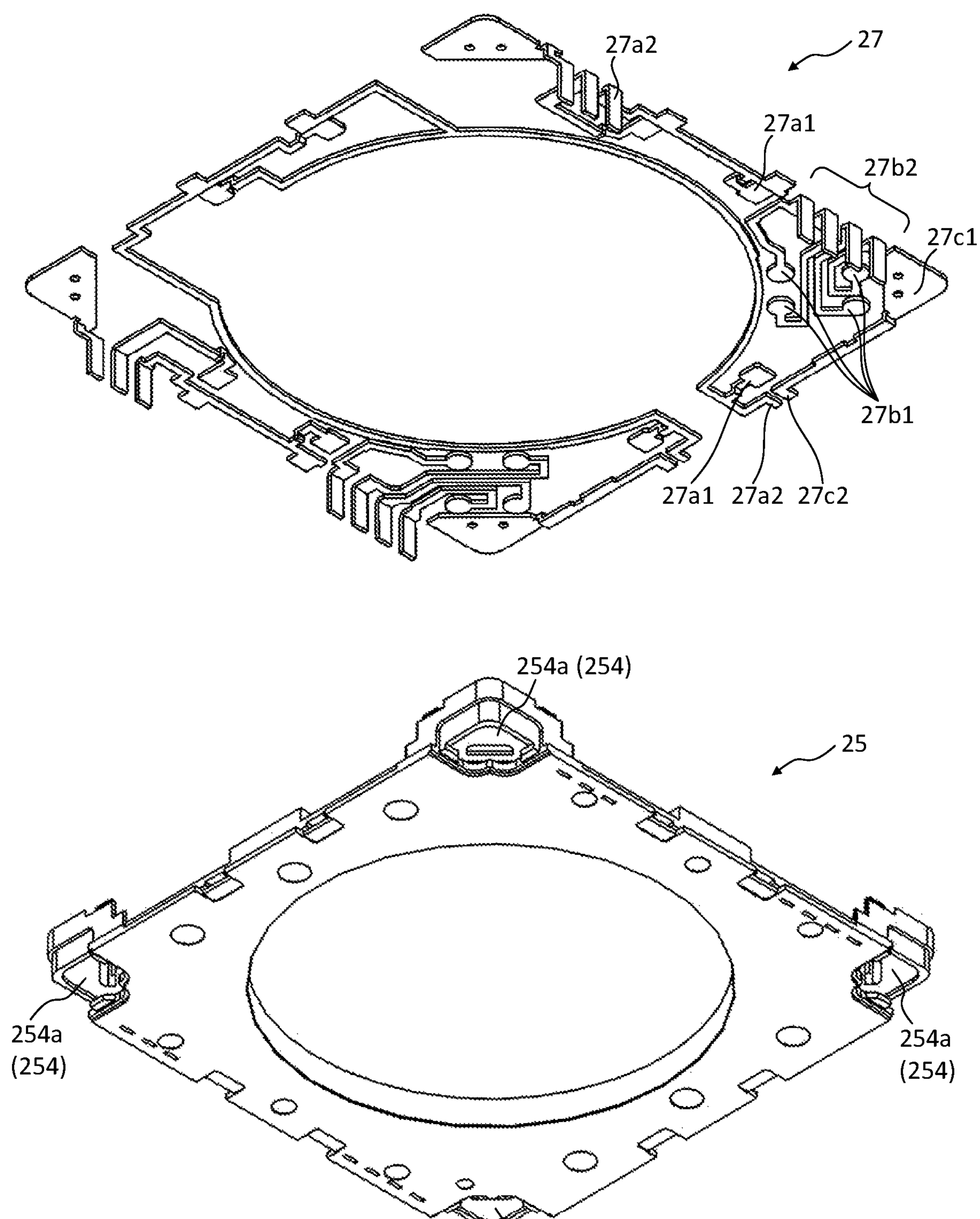
FIG. 8 is an exploded perspective view illustrating a state in which a base member and an interconnection member are disassembled in the camera module according to the embodiment of the present invention.
Figure 9:
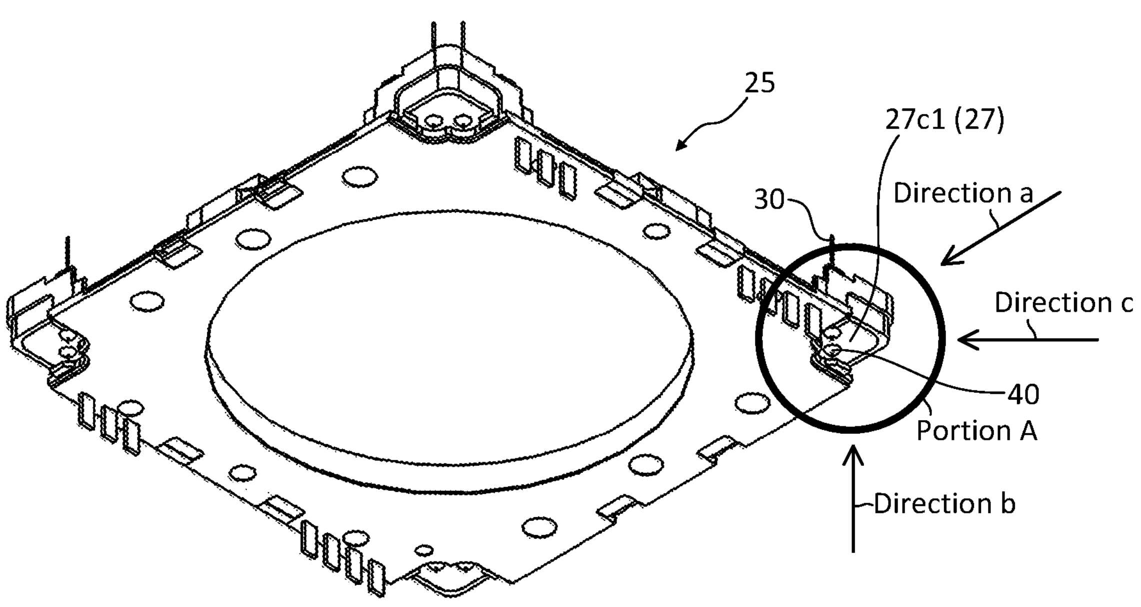
FIG. 9 is a perspective view illustrating a state in which the interconnection member is embedded in the base member such that a connecting part for connection between the interconnection member and the wire member is exposed in the camera module according to the embodiment of the present invention.
Figure 9:
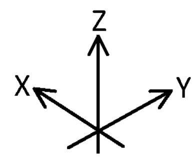
Figure 10A:
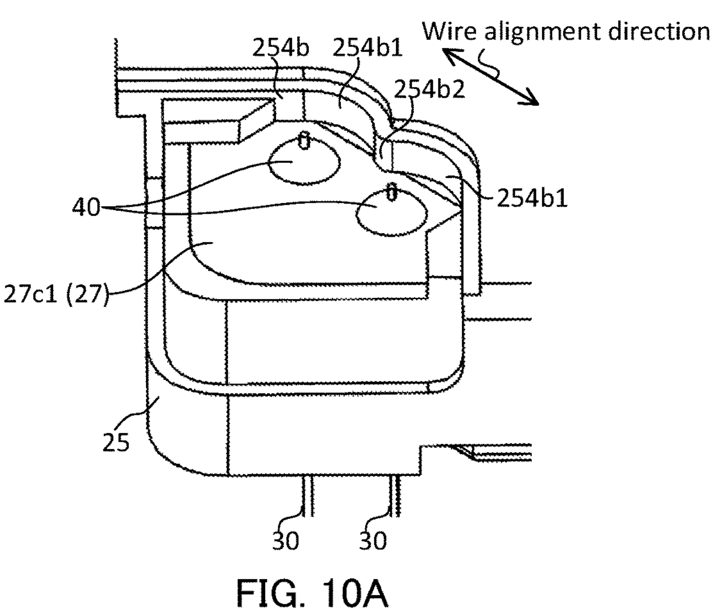
FIG. 10A is an enlarged view of portion A of the base member of the camera module according to the embodiment of the present disclosure in FIG. 9 as seen in a different direction.
Figure 10B:
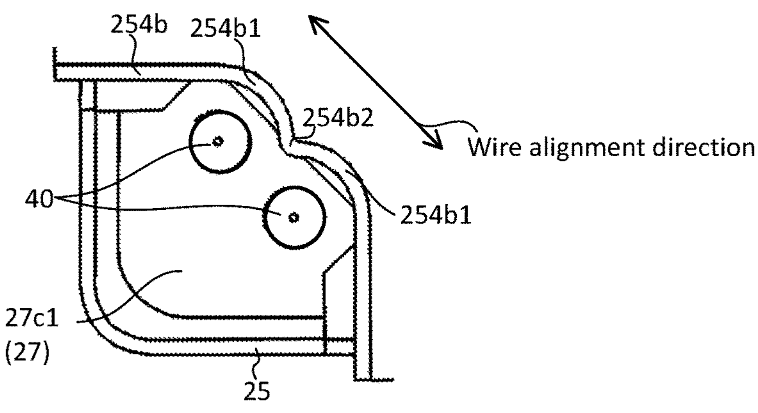
FIG. 10B is an enlarged view of portion A of the base member of the camera module according to the embodiment of the present disclosure in FIG. 9 as seen in a different direction.
Figure 10C:
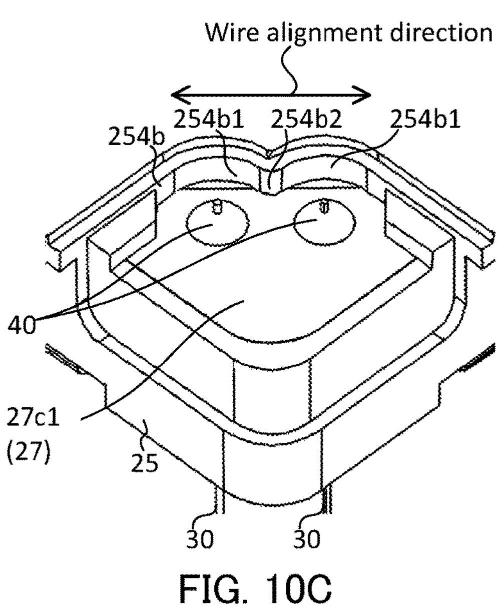
FIG. 10C is an enlarged view of portion A of the base member of the camera module according to the embodiment of the present disclosure in FIG. 9 as seen in a different direction.

FIG. 5 is an exploded perspective view of camera module A as viewed from above in a state in which cover 3 is removed from optical-element driving device 1. FIG. 6 is an exploded perspective view of the state illustrated in FIG. 5 viewed from below. FIG. 7 is an exploded perspective view illustrating an internal configuration of optical-element driving device 1 illustrated in FIG. 5 from which cover 3 is removed. Further, FIG. 8 is an exploded perspective view illustrating a state in which base member 25 and interconnection member 27 are disassembled in camera module A. FIG. 9 is a perspective view illustrating a state in which interconnection member 27 is embedded in base member 25 such that the connecting part for connection between interconnection member 27 and wire member 30 is exposed in camera module A. FIGS. 10A, 10B, and 10C are views illustrating enlarged portion A of FIG. 9 of base member 25 of camera module A viewed in direction a (parallel to the −Y-direction), direction b (parallel to the +Z-direction), and direction c (diagonal direction of base member 25) in FIG. 9, respectively. Note that, there are slight differences in arrangement and fine shape of the terminals between the configuration illustrated in FIGS. 4 to 6 and the configuration illustrated in FIGS. 7 to 9, and these differences exemplify that a variety of variations are applicable to the present embodiment in terms of the shape and arrangement other than the main features of the present invention.

Optical-element driving device 1 includes OIS correcting part 10, OIS base part 20, and suspension wires 30 as the wire member.

Regarding OIS Correcting Part 10

OIS correcting part 10 includes an OIS magnet part that forms a part of an OIS voice coil motor, which is an exemplary OIS driving part, and swings in an optical-axis-orthogonal plane during shake correction. OIS base part 20 is a part including an OIS coil part. That is, the OIS driving part of optical-element driving device 1 employs a moving magnet system. OIS correcting part 10 is also an "AF unit" including an AF driving part.

OIS correcting part 10 is disposed on OIS base part 20 so as to be spaced apart from OIS base part 20 on the + side in the Z-direction (the light reception side or the upper side in the optical-axis direction), and is coupled to OIS base part 20 by suspension wires 30.

OIS correcting part 10 includes AF focusing part 11, AF holding part 12, and AF leaf spring supporting part 13 (upper leaf spring member 13*a* and lower leaf spring member 13*b*).

Regarding AF Focusing Part 11

AF focusing part 11 is disposed radially inward with respect to AF holding part 12 and is coupled to AF holding part 12 by upper leaf spring member 13*a* and lower leaf spring member 13*b*.

AF focusing part 11 includes a coil part that forms a part of a AF voice coil motor that is an exemplary AF driving part, and is a part that moves in the Z-direction (optical-axis direction) with respect to AF holding part 12 at the time of focusing. AF holding part 12 includes a magnet part that forms a part of the AF voice coil motor. That is, the AF driving part of optical-element driving device 1 employs a moving coil system.

AF focusing part 11 includes lens holder 110 and AF coil part 111 that are the movable part.

Lens holder 110 is capable of holding lens part 2 as the optical element. Lens holder 110 includes cylindrical lens holding portion 110*a*. Lens part 2 is fixed to the inner peripheral surface of opening portion (lens housing opening portion) 110*a*1 of lens holding portion 110*a*, for example, adhesively. Note that a fixation method for fixing lens part 2 to lens holder 110 is not limited to adhesion, and may be another method.

Lens holder 110 is formed of, for example, a molded material made of polyarylate (PAR), or a PAR alloy that is a mixture of multiple resin materials containing PAR (e.g., PAR/PC). Thus, the weld strength of the lens holder is made higher than that of a conventional molded material, for example, a Liquid Crystal Polymer (LCP). Accordingly, the toughness and impact resistance of the lens holder can be secured even when lens holder 110 is thinned. Therefore, the external size of optical-element driving device 1 can be reduced, and the miniaturization and weight reduction can be achieved.

Lens holder 110 includes an upper flange and a lower flange (not illustrated) protruding radially outward respectively from the upper and lower portions of the outer peripheral surface of lens holding portion 110*a*, and the upper flange and the lower flange on the outer peripheral surface define therebetween a continuous groove over the entire circumference. That is, lens holder 110 has a bobbin structure. AF coil part 111 is disposed in the groove in the outer peripheral surface of lens holder 110.

AF coil part 111 is a coil that is energized at the time of focusing. Opposite ends of AF coil part 111 are tied to tying parts (not illustrated) disposed on lens holder 110.

Regarding AF Holding Part 12

AF holding part 12 supports AF focusing part 11 by AF leaf spring supporting part 13 such that AF focusing part 11 is movable along the optical-axis direction. AF holding part 12 includes magnet holder 12*a* and magnet parts 125 serving as a housing.

Magnet holder 12*a* has a square cylindrical shape that is square in plan view in the Z-direction. Magnet holder 12*a* surrounds the outer periphery of lens holder 110 and houses lens holder 110. Magnet holder 12*a* includes, at the inner peripheral surface at portions corresponding to the four corners, magnet placement portions in which magnet parts 125 are placed. An inner cavity portion defined by magnet holder 12*a* and magnet parts 125 mounted in the magnet placement portions forms the lens holder housing opening portion for housing AF focusing part 11.

Grooves that are recessed radially inward are formed respectively in the four corner portions at the outer peripheral surface of magnet holder 12*a*. Suspension wires 30 are disposed in each of the grooves. A damper material (e.g., silicone gel) may be disposed in the grooves, and it is possible to suppress generation of unwanted resonance (higher-order resonance mode) and stabilize the OIS operation by disposing the damper material.

Lower leaf spring member 13*b* is fixed to an end face (rear surface) of magnet holder 12*a* on the − side in the Z-direction, and upper leaf spring member 13*a* is fixed to a surface (front surface) of magnet holder 12*a* on the + side in the Z-direction.

Here, like lens holder 110, magnet holder 12*a* is formed of a molded material made of polyarylate (PAR), or a PAR alloy that is a mixture of multiple resin materials containing PAR (e.g., PAR/PC). Accordingly, the weld strength is increased, and thus the toughness and impact resistance can be secured even when magnet holder 12*a* is thinned. Therefore, the external size of optical-element driving device 1 can be reduced, and the miniaturization and height reduction can be achieved.

Magnet parts 125 include four rectangular columnar permanent magnets (an example of the magnet). Magnet parts 125 are fixed to the magnet placement portions, for example, adhesively. Here, each of magnet parts 125 has the shape of a substantially isosceles trapezoid in plan view.

It is thus possible to effectively use the corner-portion spaces (specifically, the magnet placement portions) at the four corners of magnet holder 12*a*. Magnet parts 125 are magnetized so as to form magnetic fields that traverse AF coil part 111 in the radial direction and traverse OIS coil parts 22 in the optical-axis direction. Here, magnet parts 125 are magnetized such that the inner circumferential sides are the N pole, and the outer circumferential sides are the S pole.

The end faces (back surfaces) of magnet parts 125 on the − side in the Z-direction protrude toward the − side of magnet holder 12*a* in the Z-direction. That is, the height of OIS correcting part 10 is defined by magnet parts 125. Accordingly, the height of OIS correcting part 10 is minimized in accordance with the sizes of magnet parts 125 for securing the magnetic force, and the height of optical-element driving device 1 can be reduced.

Magnet parts 125 and AF coil part 111 as described above constitute the AF voice coil motor (AF driving part). Further, magnet parts 125 are used in both of a AF magnet part and the OIS magnet part.

Regarding AF Leaf Spring Supporting Part 13

AF leaf spring supporting part 13 elastically supports AF focusing part 11 with respect to AF holding part 12. AF leaf spring supporting part 13 includes upper leaf spring member 13*a* and lower leaf spring member 13*b*. Here, the leaf springs constituting upper leaf spring member 13*a* and lower leaf spring member 13*b* are made of, for example, beryllium copper, nickel copper, or stainless steel.

Upper leaf spring member 13*a* is mounted on magnet holder 12*a* and supports lens holder 110 from the upper opening side of lens holder 110. Upper leaf spring member 13*a* is fixed, at the outer side, to the surface of magnet holder 12*a* on the + side in the Z-direction, and is fixed, at the inner side, to the surface of lens holder 110 on the + side in the Z-direction. In upper leaf spring member 13*a*, the shapes of arms extending in an intermediate portion between the outer side and the inner side are elastically deformable, and the inner portion of upper leaf spring member 13*a* is thus relatively displaceable in the Z-direction with respect to the outer portion of upper leaf spring member 13*a*.

Upper leaf spring member 13*a* is separated into a power supply path portion connected to those suspension wires 30 which are used as a power supply path to an AF control part (not illustrated), and a signal path portion connected to those suspension wires 30 which are used as a signal path for transmitting a control signal to the AF control part (not illustrated). Upper leaf spring member 13*a* forming the power supply path portion is connected to AF coil part 111 by solder at the tying parts disposed on magnet holder 12*a*. In the present embodiment, upper leaf spring member 13*a* is separated into two half bodies, but may also be further separated.

Lower leaf spring member 13*b* is fixed, at the outer side, to the surface (back surface) of magnet holder 12*a* on the − side in the Z-direction, and is fixed, at the inner side, to the surface (back surface) of lens holder 110 on the − side in the Z-direction. In lower leaf spring member 13*b*, the shapes of arms extending in an intermediate portion between the outer side and the inner side is elastically deformable, and the inner portion of lower leaf spring member 13*b* is relatively displaceable in the Z-direction with respect to the outer portion of lower leaf spring member 13*b*.

Regarding OIS Base Part 20

OIS base part 20 supports OIS correcting part 10 by suspension wires 30 such that OIS correcting part 10 is swingable in the optical-axis-orthogonal direction. OIS base part 20 includes OIS coil parts 22, magnetic sensor part 23, protective member 24, base member 25 as a fixing part, and interconnection member 27.

Regarding OIS Coil Part 22

OIS base part 20 includes OIS coil parts 22 respectively at the four corners facing magnet parts 125 in the Z-direction (optical-axis direction). OIS coil parts 22 are coils that are energized during shake correction. Four OIS coil parts 22 are disposed to correspond to magnet parts 125. Four OIS coil parts 22 are here air-core coils.

The sizes and arrangement of OIS coil parts 22 and magnet parts 125 are set such that the magnetic fields radiated from the bottom surfaces of magnet parts 125 traverse the respective long side portions of OIS coil parts 22 in the Z-direction. The combination of magnet parts 125 and OIS coil parts 22 constitutes an OIS voice coil motor (OIS driving part).

The lead-wire end portions disposed respectively on the opposite ends of OIS coil parts 22 are connected by solder to coil terminal elements 27*a*1 (an example of coil terminals) of interconnection member 27 disposed on base member 25. That is, OIS coil parts 22 are directly connected to coil terminal elements 27*a*1 without any intervening board. Base member 25 is provided with coil recessed portions (an example of second recessed portions) 252 for placement of OIS coil parts 22, and OIS coil parts 22 are respectively disposed in coil recessed portions 252 at the four corners. The arrangement of OIS coil parts 22 on base member 25 will be described in detail later.

Regarding Magnetic Sensor Part 23

OIS base part 20 includes, at the first corner portion and the fourth corner portion of the four corners, magnetic sensor parts 23 within central cavities in corresponding OIS coil parts 22. Each of magnetic sensor parts 23 detects the position of OIS correcting part 10 in the optical-axis-orthogonal plane, which is specified by using Hall elements to detect the magnetic fields formed by magnet parts 125. Specifying the position is based on the relative position between magnet parts 125 and the Hall elements in the optical-axis-orthogonal plane. Each of magnetic sensor parts 23 includes a Hall element chip assembly. The Hall element chip assembly includes the Hall element (an example of the magnetic sensor) and a magnetic sensor board on which a chip of the Hall element is mounted. The magnetic sensor board is, for example, a Printed Wiring Board (PWB).

The Hall element is disposed on a central portion of the main surface of the magnetic sensor board, and a board-side terminal part is disposed on a peripheral portion around the central portion. The board-side terminal part is connected by solder to board terminal element 27*b*1 (an example of the board terminal) of interconnection member 27 disposed on base member 25. That is, the Hall elements are connected to board terminal elements 27*b*1 via the magnetic sensor board. Base member 25 is provided with board recessed portions (an example of the first recess) for placement of the Hall element chip assemblies. The Hall element chip assemblies are disposed respectively in the board recessed portions at the four corners.

Regarding Base Member 25

Base member 25 as seen in plan view is a square member having central opening portion 250 through which the optical path or the optical axis passes. Base member 25 supports lens holder 110 and magnet holder 12*a* from the lower opening side of both lens holder 110 and magnet holder 12*a*. Base member 25 is made of a non-conductive material such as synthetic resin, for example, a Liquid Crystal Polymer (LCP). Interconnection member 27 is insert-molded in base member 25. Interconnection member 27 is an example of an electrical component disposed in base member 25.

Interconnection member 27 is a metallic plate-shaped member insert-molded in base member 25. Interconnection member 27 is made of a conductive material such as, e.g., beryllium copper, nickel copper, or stainless steel.

Interconnection member 27 includes a coil terminal member, a board terminal member, and a wire terminal member.

The coil terminal member includes coil terminal elements **27*a*1 and coil terminal connection portions 27*a*2. Coil terminal elements 27*a*1 are exposed upward at the bottom portions of coil recessed portions 252 disposed in base member 25. Coil terminal elements 27*a*1 are directly connected by solder to the lead wires of OIS coil parts 22 disposed in coil recessed portions 252. Coil terminal connection portions 27*a*2 protrude from an outer edge of base member 25 and is connectable to external image sensor board 501. In the coil terminal member, portions other than portions exposed or protruding from base member 25 are embedded in base member 25**.

The board terminal member includes board terminal elements **27*b*1 board terminal connection portions 27*b*2. Board terminal elements 27*b*1 are exposed upward at the bottom portions of the board recessed portions disposed in base member 25. Board terminal elements 27*b*2 are directly connected by solder to the board-side terminal parts of the Hall element chip assemblies of magnetic sensor parts 23 disposed in the board recessed portions. Board terminal connection portions 27*b*2 protrude from the outer edge of base member 25 and are connectable to external image sensor board 501. In the board terminal member, portions other than portions exposed or protruding from base member 25 are embedded in base member 25**.

The wire terminal member includes wire terminal elements **27*c*1 and wire terminal connection portions 27*c*2. Wire terminal elements 27*c*1 are disposed so as to be exposed downward at bottom portions 254*a* of wiring connection recessed portions 254 located at the four corners of base member 25, and are directly connected by solder to the lower ends of suspension wires 30 inserted through insertion holes formed in the wire terminal elements. Wire terminal connection portions 27*c*2 protrude from the outer edge of base member 25 and are connectable to external image sensor board 501. In the wire terminal member, portions other than portions exposed or protruding from base member 25 are embedded in base member 25. Note that, in the wire terminal member, the portions exposed or protruding from base member 25 are exposed to the outside during assembly of optical-element driving device 1, but it is preferable that these portions be covered with sealing material 28** or the like made of resin after completion.

Regarding Protective Member 24

Protective member 24 is disposed so as to cover a region surrounding central opening portion 250 in base member 25. Protective member 24 is a thin plate member or a film member made of a non-conductive material such as a resin material. Protective member 24 completely covers placement regions in which OIS coil parts 22 are disposed. Thus, protective member 24 is interposed between OIS coil part 22 and magnet parts 125 in the Z-direction. Therefore, it is possible to prevent OIS coil part 22 and magnet parts 125 from colliding with each other due to an external impact. In addition, it is also possible to prevent short-circuiting caused when lower leaf spring member **13*b*, which is made of metal, makes contact with OIS coil part 22**, which is also made of metal.

Regarding Suspension Wire 30

Suspension wires 30 are elastic rod-shaped members extending along the Z-direction. A group of two suspension wires 30 is disposed to correspond to each of the four corner portions of magnet holder **12*a*. Note that a group of three suspension wires 30 may be disposed to correspond to each of the four corner portions of magnet holder 12*a*. In respective suspension wires 30, one ends (lower ends) are fixed to OIS base part 20, and the other ends (upper ends) are fixed to OIS correcting part 10 (specifically, upper leaf spring member 13*a*). OIS correcting part 10 is supported by suspension wires 30** so as to be swingable in the optical-axis-orthogonal plane.

Suspension wires 30 extend between base member 25 and upper leaf spring member **13*a* and supports magnet holder 12*a*. The groups of suspension wires 30 disposed respectively at the four corner portions of magnet holder 12*a* are connected to the same upper leaf spring member 13*a*. The groups of suspension wires 30 disposed respectively at the four corner portions of magnet holder 12*a* are aligned with one another equidistantly from the optical axis of lens part 2**.

Here, one pair of suspension wires 30 is disposed to correspond to each of the four corner portions. Such an arrangement makes it possible to support OIS correcting part 10 of the same weight even when the spring constant per suspension wire is lower (in other words, when the flexibility is higher) than in the case where a single suspension wire is disposed to correspond to each of the four corner portions. It is thus possible to achieve both stable support performance and swing performance in shake correction. Further, since it becomes less likely for the stress to be concentrated on individual suspension wires 30, the durability can also be improved.

All suspension wires 30 disposed to correspond to the four corner portions are used as the power supply path to AF coil part 111, or suspension wires 30 disposed to correspond to the four corner portions are selectively used as the power supply path to AF coil part 111. The number of suspension wires 30 is not limited to eight, and may be greater than eight as long as the performance of supporting OIS correcting part 10 in a swingable manner is maintained.

Regarding Wiring Connection Recessed Portion 254 of Base Member 25

Wiring connection recessed portions 254 are formed in the four corners of base member 25 on the bottom surface side. Wiring connection recessed portions 254 are recessed from the − side toward the + side in the Z-direction, and form steps in the upper and lower directions between bottom portions **254*a* of wiring connection recessed portions 254 and the bottom surface of base member 25. On bottom portions 254*a* of wiring connection recessed portions 254, wiring connecting parts 40 to which wire terminal elements 27*c*1 of interconnection member 27 and the lower end portions of suspension wires 30** are connected are exposed downward.

During assembly of optical-element driving device 1, the spaces of wiring connection recessed portions 254 serve as working spaces for connecting (soldering) the lower ends of suspension wires 30 to wire terminal elements **27*c*1 of interconnection member 27. Therefore, if these working spaces are significantly narrow, the connecting operation between suspension wires 30 and interconnection member 27 is difficult, and sidewalls 254*b* of wiring connection recessed portions 254 are positioned close to wiring connecting parts 40, thus becoming susceptible to the heat applied to wiring connecting part 40 during the connecting operation. On the other hand, if the working space is remarkably large, it is difficult to realize a configuration in which interconnection member 27 is positioned with respect to base member 25, while maintaining the miniaturization of optical-element driving device 1**.

Therefore, in the present embodiment, sidewalls 254*b* of wiring connection recessed portions 254 surrounding the working spaces are corrugated.

Specifically, sidewalls 254*b* are shaped to include indentation portions 254*b*1 and protruding portion 254*b*2 alternately, indentation portions 254*b*1 being indented in an arc shape so as to bypass suspension wires 30 at respective positions corresponding to two suspension wires 30 in a wire alignment direction within each of the corner portions, protruding portion 254*b*2 protruding toward a gap between adjacent suspension wires 30 in the wire alignment direction within each of the corner portions.

This shape allows sidewalls 254*b* to be spaced apart from individual suspension wires by a certain distance. Accordingly, sidewalls 254*b* are less susceptible to the heat transmitted to the peripheries of individual suspension wires 30 when suspension wires 30 are connected to interconnection member 27. Thus, there is no possibility that undesired deformation is caused in sidewalls 254*b*. Moreover, since the portions of the sidewalls between adjacent suspension wires 30 protrude toward the gaps and the sidewalls do not have a simple shape which increases the exposed area of interconnection member 27, there is no possibility that the planar area of base member 25 is significantly increased. Therefore, it is possible to achieve both miniaturization and mass productivity of optical-element driving device 1, and camera module A and the camera-mounted device including the optical-element driving device.

Further, by utilizing this shape, indentation portions 254*b*1 may be configured not to overlap with wire terminal elements 27*c*1 of interconnection member 27 in the Z-direction, and protruding portions 254*b*2 may be configured to overlap wire terminal elements 27*c*1 of interconnection member 27 in the Z-direction. In this case, the insusceptibility of indentation portions 254*b*1 to the heat transmitted to wire terminal elements 27*c*1 when suspension wires 30 are connected to interconnection member 27 is increased. That is, the thermal effect on sidewalls 254*b* can be further reduced.

Further, in this case, protruding portions 254*b*2 overlap with wire terminal elements 27*c*1, and accordingly, interconnection member 27 can be pressed against bottom portions 254*a* of wiring connection recessed portions 254. Therefore, sidewalls 254*b* can have a function for positioning interconnection member 27 in the Z-direction.

As described above, in the present embodiment, optical-element driving device 1 is configured such that lens holder 110 capable of holding lens part 2 and magnet holder 12*a* housing lens holder 110 are supported by AF leaf spring supporting part 13 and suspension wires 30 above base member 25, and are moved by driving OIS correcting part 10 and AF focusing part 11. In such a configuration, suspension wires 30 include at least one set of a plurality of suspension wires 30 aligned with each other, configured to couple base member 25 to magnet holder 12*a*, and connected to interconnection member 27 of base member 25. Base member 25 includes wiring connection recessed portions 254 that are recessed in the upper-lower direction (Z-direction) and exposes, on bottom portions 254*a* thereof, the connecting parts (wiring connecting parts 40) for connection between interconnection member 27 and suspension wires 30. Sidewalls 254*b* of wiring connection recessed portions 254 include first portions (indentation portions 254*b*1) that correspond to suspension wires 30 in the direction in which the plurality of suspension wires 30 are aligned with each other, a second portion (protruding portion 254*b*2) that is located between the adjacent first portions (indentation portion 254*b*1). The sidewalls are shaped such that the first portions (indentation portions 254*b*1) are indented to bypass corresponding suspension wires 30 and the second portion (protruding part 254*b*2) protrudes toward the gap between adjacent suspension wires 30.

According to this configuration, as described above, it is possible to achieve both miniaturization and mass productivity of optical-element driving device 1, and camera module A and the camera-mounted device including the optical-element driving device.

Further, in the present embodiment, sidewalls 254*b* do not overlap at the first portions (indentation portions 254*b*1) with interconnection member 27 in the upper-lower direction (Z-direction), and overlap at the second portion (protruding portion 254*b*2) with interconnection member 27 in the upper-lower direction (Z-direction).

As described above, this configuration makes it possible for sidewalls 254*b* to have a function for positioning of interconnection member 27 in the Z-direction, and thus makes it possible to increase the effect of enabling both miniaturization and mass productivity of optical-element driving device 1, and camera module A and the camera-mounted device including the optical-element driving device.

The embodiment of the present invention has been described above. The aforementioned embodiments merely describe examples of implementations for practicing the present invention, and should not be construed as limiting the technical scope of the present invention. That is, the present invention can be implemented in various forms without departing from its key features.

REFERENCE SIGNS LIST

1 Optical-element driving device
2 Lens part (optical element)
3 Cover
5 Image capturing part
10 OIS correcting part (driving part)
11 AF focusing part (driving part)
12 AF holding part
12*a* Magnet holder (housing)
13 AF leaf spring supporting part (supporting part)
13*a* Upper leaf spring member (leaf spring member)
13*b* Lower leaf spring member
20 OIS base part
22 OIS coil part
23 Magnetic sensor part
24 Protective member
25 Base member (fixing part)
27 Interconnection member (electrical component)
27*a*1 Coil terminal element
27*a*2 Coil terminal connection portion
27*b*1 Board terminal element
27*b*2 Board terminal connection portion
27*c*1 Wire terminal element
27*c*2 Wire terminal connection portion
28 Sealing material
30 Suspension wire (wire member; supporting part)
40 Wiring connecting part
110 Lens holder (movable part)
110*a* Lens holding portion
110*a*1 Lens housing opening portion

111 AF coil part
125 Magnet part
250 Central opening portion
252 Coil recessed portion
254 Wiring recessed portion
**254*a*** Bottom portion
**254*b*** Sidewall
**254*b*1** Indentation portion (first portion)
**254*b*2** Protruding portion (second portion)
301 Opening portion
501 Image sensor board
502 Image capturing element
503 Control part

The invention claimed is:

1. An optical-element driving device that supports a movable part and a housing above a fixing part by a supporting part, the movable part being capable of holding an optical element, the housing being configured to house the movable part, the optical-element driving device being configured to move the movable part and the housing by driving a driving part, wherein:

the supporting part includes at least one set of a plurality of wire members aligned with each other, configured to couple the fixing part to the housing, and connected to an electrical component of the fixing part, and the fixing part includes: a portion in which the electrical component is embedded; and a recessed portion that is recessed in an upper-lower direction and exposes, on a bottom portion of the recessed portion, a connecting part for connection between the electrical component and each of the plurality of wire members, the recessed portion including a sidewall that includes a first portion and a second portion in a direction in which the plurality of wire members are aligned with each other, the first portion being located at a position corresponding to each of the plurality of wire members, the second portion being located between adjacent ones of a plurality of the first portions, the sidewall being shaped to be indented at the first portion so as to bypass a corresponding wire member, and to protrude at the second portion toward a gap between the adjacent wire members, the second portion of the sidewall being overlapping with the electrical component in the upper-lower direction so as to function as a positioning member for the electrical component in the upper-lower direction.

2. The optical-element driving device according to claim 1, wherein the sidewall does not overlap at the first portion with the electrical component in the upper-lower direction.

3. A camera module, comprising:

the optical-element driving device according to claim 1;

the optical element; and an image capturing part configured to capture a subject image imaged by the optical element.

4. A camera-mounted device that is an information apparatus or a transporting apparatus, the camera-mounted device comprising:

the camera module according to claim 3; and an image processing part configured to process image information obtained by the camera module.

* * * * *